United States Patent
Thibaut et al.

(10) Patent No.: US 10,245,710 B2
(45) Date of Patent: Apr. 2, 2019

(54) DEVICE FORMING A WORKPIECE CLAMP

(75) Inventors: Jacques Thibaut, Vaudry (FR);
Christophe Thibaut, Vire (FR)

(73) Assignee: THIBAUT, Vire (FR)

( * ) Notice: Subject to any disclaimer, the term of this patent is extended or adjusted under 35 U.S.C. 154(b) by 417 days.

(21) Appl. No.: 13/995,299

(22) PCT Filed: Dec. 20, 2011

(86) PCT No.: PCT/FR2011/053087
§ 371 (c)(1),
(2), (4) Date: Jun. 18, 2013

(87) PCT Pub. No.: WO2012/085446
PCT Pub. Date: Jun. 28, 2012

(65) Prior Publication Data
US 2013/0270757 A1    Oct. 17, 2013

(30) Foreign Application Priority Data
Dec. 20, 2010 (FR) .................................. 10 60828

(51) Int. Cl.
*B25B 11/00*      (2006.01)
*B23Q 1/03*       (2006.01)
*B23Q 3/08*       (2006.01)

(52) U.S. Cl.
CPC .............. *B25B 11/007* (2013.01); *B23Q 1/03* (2013.01); *B23Q 3/088* (2013.01); *B25B 11/005* (2013.01)

(58) Field of Classification Search
CPC ...... B25B 11/00; B25B 11/005; B25B 11/007
See application file for complete search history.

(56) References Cited

U.S. PATENT DOCUMENTS

| | | | | |
|---|---|---|---|---|
| 1,130,679 A | * | 3/1915 | Staunton ................ | G03B 27/60 |
| | | | | 248/363 |
| 2,756,644 A | * | 7/1956 | Steele ............................. | 269/21 |
| 2,782,574 A | * | 2/1957 | Copold ......................... | 451/388 |
| 3,520,055 A | * | 7/1970 | Jannett ........................... | 29/830 |
| 3,584,859 A | * | 6/1971 | Siron ............................. | 269/21 |
| 3,652,075 A | * | 3/1972 | Thompson ..................... | 269/21 |
| 3,797,797 A | * | 3/1974 | Keller ........................... | 248/362 |
| 4,561,642 A | * | 12/1985 | Parque ........................... | 269/21 |
| 5,553,837 A | * | 9/1996 | Kahle ............................. | 269/21 |

(Continued)

FOREIGN PATENT DOCUMENTS

| | | | |
|---|---|---|---|
| CN | 202971351 U | * | 6/2013 |
| DE | 295 18 188 U1 | | 1/1996 |

(Continued)

OTHER PUBLICATIONS

International Search Report, dated Jun. 13, 2012, from corresponding PCT application.

*Primary Examiner* — Tyrone V Hall, Jr.
(74) *Attorney, Agent, or Firm* — Ipsilon USA, LLP

(57) ABSTRACT

A device forming a clamping pad includes a body (1) presenting a first face (1*a*) to be secured by suction to a worktable (T) and a second face (1*b*) to be secured by suction to a workpiece (P). The body (1) contains elements for generating suction, which elements are linked to the first face (1*a*) to be secured to the worktable (T) and to the second face (1*b*) to be secured to a workpiece (P). The device is applicable to double-sided clamping of workpieces (P) with a view to treating them or to working on them.

15 Claims, 3 Drawing Sheets

(56) References Cited

U.S. PATENT DOCUMENTS

| | | | | |
|---|---|---|---|---|
| 6,068,547 | A * | 5/2000 | Lupi | 451/388 |
| 6,264,259 | B1 * | 7/2001 | Fortune | B25B 11/007 |
| | | | | 294/186 |
| 6,286,822 | B1 * | 9/2001 | Blick | 269/21 |
| 6,817,933 | B2 * | 11/2004 | Blick | 451/388 |
| 8,439,490 | B2 * | 5/2013 | Cheng | B41J 2/17556 |
| | | | | 347/85 |
| 2007/0175022 | A1 * | 8/2007 | Chang | 29/743 |
| 2008/0277885 | A1 | 11/2008 | Duff et al. | |

FOREIGN PATENT DOCUMENTS

| | | | |
|---|---|---|---|
| DE | 196 29 685 A1 | 10/1997 | |
| DE | 20 2009 006 437 U1 | 7/2009 | |
| EP | 1 342 533 A1 | 9/2003 | |
| FR | 2 546 790 A1 | 12/1984 | |
| FR | 2890325 A1 * | 3/2007 | ........... B25B 11/005 |
| FR | 2950556 A1 * | 4/2011 | ............... B23Q 1/38 |
| WO | 2007/028886 A1 | 3/2007 | |

\* cited by examiner

DEVICE FORMING A WORKPIECE CLAMP

BACKGROUND OF THE INVENTION

Field of the Invention

The invention relates to a device forming a clamping pad, of the type comprising a first face to be secured by suction to a worktable and a second face to be secured by suction to a workpiece.

Description of the Related Art

Documents EP 1 342 533 A1 and WO 2007/028 886 A1 describe automatic machines for working materials in sheet or plate form, in which the materials to be worked are positioned and held by double-sided clamping pads. Double-sided clamping pads comprise a top suction cup and a bottom suction cup. The top and bottom suction cups are connected to air and vacuum pipes. The suction that makes it possible to fasten the clamping pad to the worktable and the workpiece to be fastened to the clamping pad is obtained by pumping through side suction pipes, and the presence of those pipes on the worktable leads to a risk of a suction pipe catching the machining tool and may lead to a risk of accident for the operator of the machine-tool. Attempts are made to avoid those risks by pressing the suction pipes onto the machining surface by parts or wedges pressing thereon. However, the pipes pressed on the machining surface retain dust, sludge, and swarf, entrained by the machining lubrification fluid, and that harms the quality of work.

Finally, it has been envisaged to arrange a plurality of orifices opening out into the worktable and to use the orifices in register with the suction cups to convey the suction through said orifices. Although that arrangement gives satisfaction, it does not make it possible to place the positioning pads in any desired position. In addition, the orifices used are liable to become soiled and thus to impede correct operation of the positioning pad.

BRIEF SUMMARY OF THE INVENTION

A first object of the invention is to overcome the drawbacks of the state of the art, by removing the suction and vacuum pipes of the prior art.

A second object of the invention is to enable double-sided suction cups to be placed in any desired location on the worktable.

A third object of the invention is to avoid risks of accidents for the operator of the machine-tool, and to improve the quality of the work during use of the clamping pads.

A fourth object of the invention is to facilitate positioning of the workpiece on the clamping pad, by improving the ease and quality of movement in translation of the workpiece on the clamping pads fastened to the worktable.

The invention provides a device forming a clamping pad, of the type comprising a body presenting a first face to be secured by suction to a worktable and a second face to be secured by suction to a workpiece, the pad being characterized by the fact that the body contains means for generating suction, which means are linked to said first face to be secured by suction to the worktable and to said second face to be secured by suction to a workpiece.

According to other alternative characteristics of the invention:

The suction generator means comprise a vacuum pump and an energy source for powering said vacuum pump.
The energy source for powering said vacuum pump comprises at least one battery.
The suction generator means present means forming an on/off switch for the power supply.
The suction forming means may present at least one normally open valve for applying suction to said second face to be secured to the workpiece, in such a manner as to save the energy of maintaining the valve in a predetermined position.
The normally open valve for applying suction to said second face to be secured to the workpiece, is connected in parallel on the line for applying suction to the first face to be secured to the worktable.
The body may contain a vacuum buffer tank, suitable for being evacuated by the suction generator means.
The device may include means for lifting the workpiece, in order to facilitate moving it in translation and positioning it.
Said means for lifting the workpiece comprise a jack, preferably a ball screw jack.
Said means for lifting the workpiece may be controlled by at least one normally open valve for applying suction, in such a manner as to save the energy of maintaining the valve in a predetermined position.

BRIEF DESCRIPTION OF THE DRAWINGS

The invention can be better understood by means of the description given below, given by way of non-limiting example and with reference to the accompanying drawings, in which:

FIG. 4 is an exploded diagrammatic view of the clamping device of the invention shown in FIG. 3.

DETAILED DESCRIPTION OF THE PREFERRED EMBODIMENTS

With reference to FIGS. 1 to 4, elements that are identical or functionally equivalent are identified by identical reference numbers.

Figure 1:
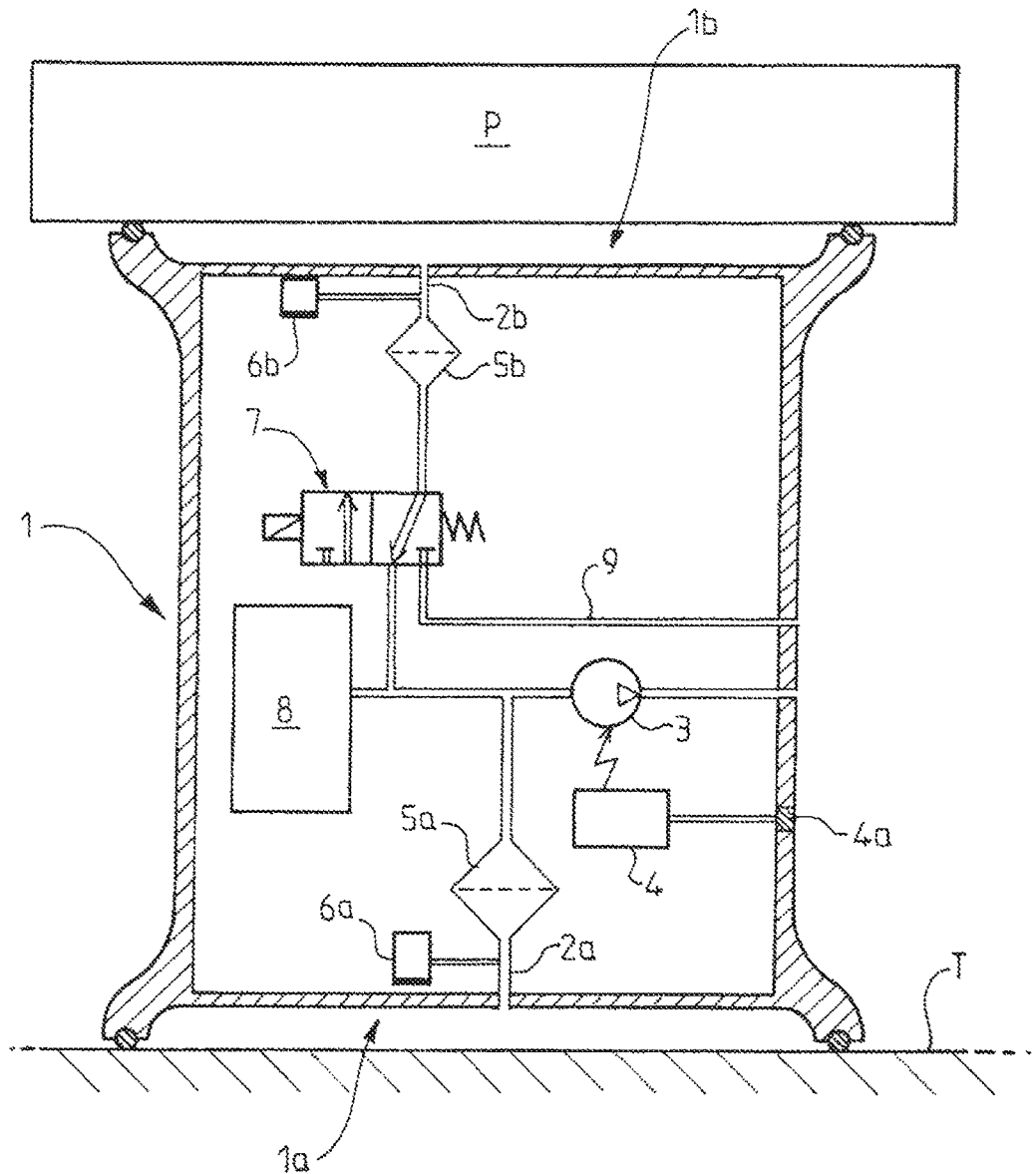
FIG. 1 is a diagram showing a diametral section view of a clamping device of the invention.
Figure 2:
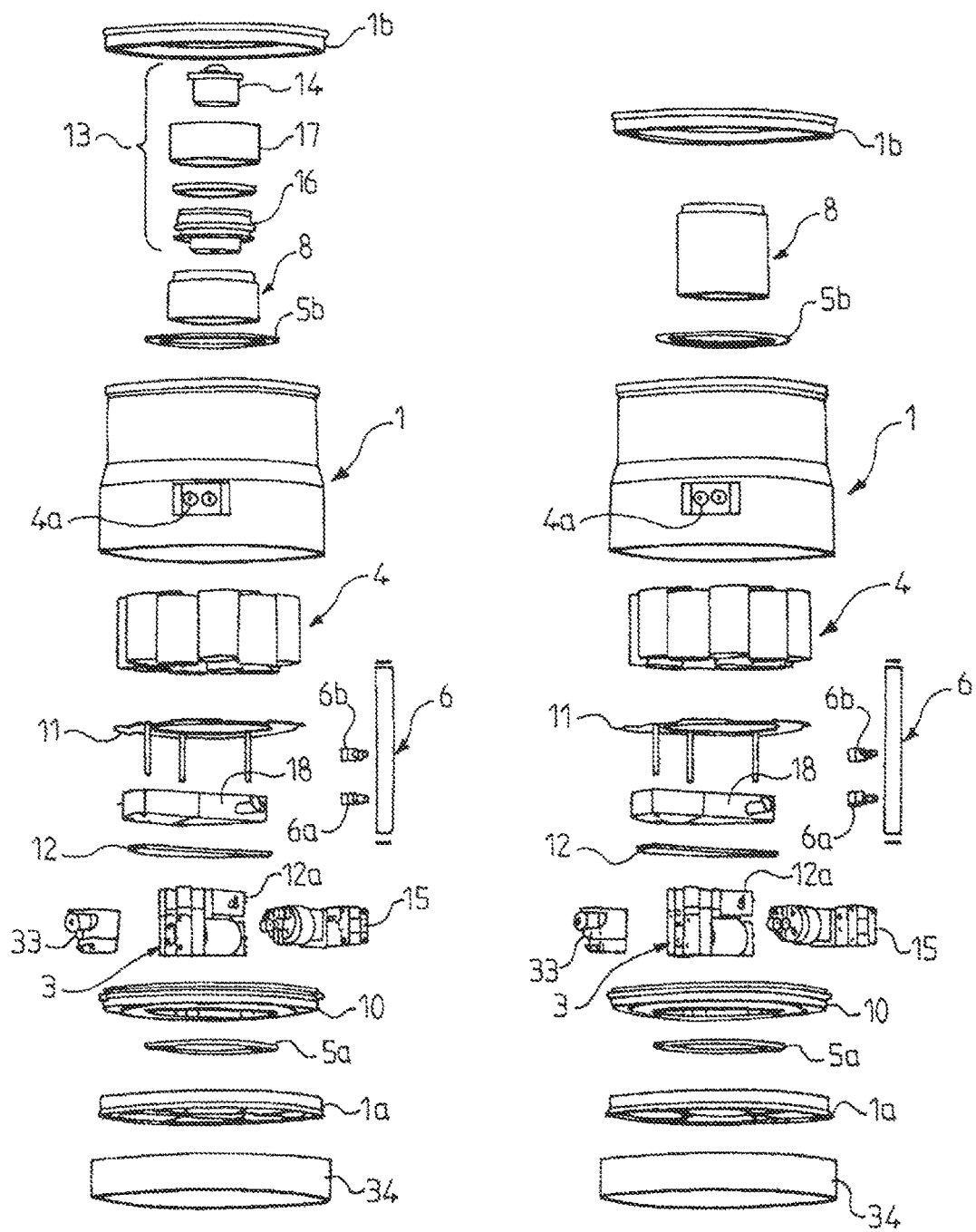
FIG. 2 is an exploded diagrammatic view of the clamping device of the invention shown in FIG. 1.

In FIGS. 1 and 2, a clamping device of the invention comprises a body (1) of substantially cylindrical shape presenting a first suction face (1*a*) to be secured by suction to a worktable (T) shown in dotted lines and presenting a second suction face (1*b*) to be secured by suction to a workpiece (P).

The body (1) contains means for generating suction, which means are linked to said first face (1*a*) to be secured to the worktable (T) and to said second face (1*b*) to be secured to a workpiece (P), via respective appropriate ducts (2*a*, 2*b*).

The suction generator means essentially comprise a vacuum pump (3) associated with an energy source (4) for powering said vacuum pump (3).

The suction vacuum pump (3) is suitable for generating suction on the bottom first face to be secured by suction to the worktable (T), as well as onto the second face to be secured by suction to the workpiece (P).

The vacuum pump (3) is, firstly, advantageously associated with a first filter (5*a*) disposed on the duct (2*a*) associated with the bottom first suction face (1*a*).

The vacuum pump (3) is, secondly, advantageously associated with a second filter (5b) disposed on the duct (2b) associated with the second suction face (1b) to be secured to a workpiece (P).

A first vacuum gauge (6a) is advantageously provided in order to provide a signal representative of the suction generated on the first suction face (1a), and a second vacuum gauge (6b) is advantageously provided to provide a signal representative of the suction generated on the second suction face (1b).

A vacuum gauge (6a) or (6b) is a suction detector for detecting the suction generated on the bottom first face to be secured by suction to the worktable (T), or on the second face to be secured by suction to the workpiece (P), and to deliver an electrical or mechanical signal indicating the presence of a vacuum representative of a holding strength value on the bottom first face to be secured by suction to the worktable (T), or on the second face to be secured by suction to the workpiece (P).

A control valve (7) is associated with the second face (1b) to be secured by suction to the workpiece (P) in order to apply suction to said second suction face (1b) to apply suction, or in order to enable said second suction face (1b) to be set to atmospheric pressure.

The control valve (7) advantageously consists of a solenoid valve that is normally open for applying suction to the second face (1b) to be secured to the workpiece (P), in such a manner as to save the energy of maintaining the solenoid valve (7) in said predetermined suction position.

The coil or "solenoid" of the solenoid valve (7) is also preferably powered by the same energy source (4).

A vacuum buffer tank (8) connected to the vacuum pump (3) may be provided in order to ensure regularity of the vacuum pump (3) and to avoid repeated stopping and starting of the vacuum pump at short intervals.

This vacuum buffer tank (8) also makes it possible to save energy obtained from the power supply (4).

In the embodiment shown, the energy source (4) comprises at least one electric battery that is preferably rechargeable via a socket (4a). The invention also covers any other method of powering the vacuum pump (3), in particular methods of powering remotely, e.g. by electromagnetic, microwave, or any other transmission means.

The vacuum pump (3) is advantageously an electric vacuum pump when power is supplied by electric batteries. In this configuration, the vacuum pump (3) is preferably in the form of a unit comprising an electric motor and a suction block actuated by said electric motor.

The electric batteries (4) are preferably rechargeable storage batteries of the electrochemical type associating a nickel hydroxide with a metal hydride and presenting an energy density in the charged state that lies in the range 30 watt-hours per kilogram Wh/kg to 100 Wh/kg.

The vacuum pump (3) is preferably an eccentric diaphragm vacuum pump presenting a nominal suction flowrate lying in the range 1 liters per minute (L/min) to 5 L/min, and suitable for reaching suction of the order of 500 millibars relative to atmospheric pressure.

The suction generator means may be turned on manually by means for forming an on/off switch for the power supply, or may alternatively be controlled by an electronic circuit, possibly comprising a microcontroller, in such a manner as to use the power supply solely to compensate suction leaks likely to impede correct clamping of the workpiece (P) relative to the worktable (T).

When the suction generator means are controlled by an electronic control circuit, the suction signals from the vacuum gauges (6a, 6b) are used as input signals for a feedback loop or for an operating program stored in the microcontroller of the control circuit.

A method of using the clamping device of FIG. 1 begins with a step of positioning the clamping pad on a worktable (T).

The clamping pads on the table (T) may be positioned manually, or else automatically by a work machine fitted with a spindle that is adapted for that purpose.

After the clamping pads have been positioned, the vacuum pump (3) and the electromagnetic solenoid valve (7) are activated simultaneously, in such a manner as to isolate the top suction face (1b) by ensuring it is in communication with atmospheric pressure and in such a manner as to generate suction on the bottom face (1a) that is to be secured to the worktable (T).

After the first face (1a) has been clamped by suction to the worktable (T) and after a vacuum has been created in the buffer tank (8), the workpiece (P) is placed on the top suction face (1b) and the solenoid valve (7) is de-activated, in order to bring it back to the normally open suction position of FIG. 1.

Operation of the vacuum pump (3) thus ensures that the workpiece (P) is secured by suction to the top suction face (1b) of the clamping pad of the invention.

When the vacuum gauges (6a, 6b) indicate that the level of suction is satisfactory, the vacuum pump (3) containing a check valve that is not shown in detail may be stopped, and suction may be maintained by means of the vacuum buffer tank (8).

For a variant embodiment not containing a vacuum gauge (6a, 6b), operation of the vacuum pump (3) may be interrupted at the end of a predetermined amount of time corresponding to a sufficient level of suction at the bottom (1a) and top (1b) suction faces.

After the workpiece (P) has been clamped to the worktable (T), the work operation proper is then performed: machining, shaping, or other surface treatment operations on the workpiece (P).

After performing the work operations on the workpiece (P), the worked piece (P) may be removed from the worktable (T).

To this end, the solenoid valve (7) is activated in order to cause the solenoid valve to communicate with atmospheric pressure. Air entering via the atmospheric pressure duct (9) makes it possible to eliminate the clamping suction on the suction face (1b), and that releases the workpiece (P).

During release of the worked piece (P), suction is maintained beside the first suction face (1a) due to the fact that the duct (2a) is blocked by the solenoid valve (7), when the solenoid valve (7) is urged into its activation position.

The worked piece (P) can thus be removed while the clamping pad of the invention remains secured by suction to the worktable (T) via its bottom face (1a).

After the worked piece (P) has been removed, the solenoid valve (7) is deactivated in order for it to move back into the normally open position of FIG. 1.

In this normally open position of FIG. 1, air enters via the top face (1b) through the duct (2b) and feeds the suction circuit in order to bring it to atmospheric pressure and in order to eliminate the suction on the bottom first suction face (1a).

Bringing the first suction face (1a) to atmospheric pressure releases the clamping pad and makes it possible to move it on or away from the worktable (T).

The clamping pad of the invention may be moved manually or in automatic manner by a machine adapted to this purpose, and the power supply may optionally be recharged in a recharging position, by plugging into the power socket (4*a*).

The device forming the clamping pad of the invention may be re-used at will in the same succession of steps as described above.

In FIG. 2, a clamping pad of the invention includes a bottom cover (10) assembled to the body (1) of the clamping pad. The body (1) of the clamping pad of the invention presents a hollow cylindrical shape containing in its top portion a set of several storage batteries (4) that are suitable for being recharged via a socket (4*a*).

The set of storage batteries (4) is mounted on a plate (11) supporting a vacuum buffer tank (8). The plate (11) is spaced apart from another plate (12) carrying an electronic circuit (not shown in detail) and supporting a solenoid valve (7) as described with reference to FIG. 1.

Under its bottom portion, the plate (12) receives a drilled block (12*a*) to which the vacuum pump is fastened (3), in such a manner that the vacuum pump (3) is suspended inside the body (1) at a predetermined distance making it possible to avoid any water entering while the suction-cup forming bottom face (1*a*) has suction applied thereto to secure it to the worktable (T).

The assembly suspended in the top portion of the body (1) may thus be installed or removed after removal of the bottom cover (10).

The suction-cup forming bottom face (1*a*) to be secured to the worktable (T) is attached to the bottom cover (10).

The vacuum pump (3) is, firstly, advantageously associated with a first filter (5*a*) associated with the suction-cup forming bottom first face (1*a*).

The vacuum pump (3) is, secondly, advantageously associated with a second filter (5*b*) associated with the suction-cup forming second face (1*b*) that is to be secured to a workpiece (P).

A first vacuum gauge (6*a*) is advantageously provided in order to deliver a signal representative of the suction generated at the suction-cup forming first face (1*a*), and a second vacuum gauge (6*b*) is advantageously provided in order to deliver a signal representative of the suction generated at the suction-cup forming second face (1*b*).

A vacuum gauge (6*a*) or (6*b*) is advantageously mounted on a column (6) presenting two open bore holes.

The control valve (7) is connected via ducts (not shown) to the suction-cup forming second face (1*b*) that is to be secured by suction to the workpiece (P) in order to enable said suction-cup forming second face (1*b*) to be secured by suction, or in order to enable said suction-cup forming second face (1*b*) to be set to atmospheric pressure.

The control valve (7) advantageously consists of a solenoid valve that is normally open for applying suction to the second face (1*b*) to be secured to the workpiece (P), in such a manner as to save the energy of maintaining the solenoid valve (7) in said predetermined suction position.

A vacuum buffer tank (8) connected to the vacuum pump (3) ensures regularity of the vacuum pump (3) and avoids repeated stopping and starting of the vacuum pump at short intervals.

This modular arrangement makes it possible to manufacture clamping-pad forming devices of the invention that are as compact as prior-art double-sided clamping pads as fed by prior-art vacuum hoses.

A fluid curtain is disposed at the periphery of the suction-cup forming top second face (1*b*), in order to constitute a coaxial capillary gasket and to avoid "drying" and detachment of the suction-cup forming top second face (1*b*), by further preventing undesirable dust, sludge, swarf, or other particles from penetrating therein.

The fluid curtain, in particular a liquid curtain, thus reinforces sealing by capillarity at the top suction face (1*b*) and contributes to saving the energy required for establishing suction and for maintaining clamping by suction.

Machining lubrification water is advantageously used to form a fluid curtain or barrier, by pumping using a liquid pump 33 sucking up the machining lubrification water through an outer filter 34 surrounding the body 1.

An electronic control circuit connected by communication means, preferably wireless communication means, to the machine-tool makes it possible to manage a stock of double-sided clamping pads of the invention.

Figure 3:
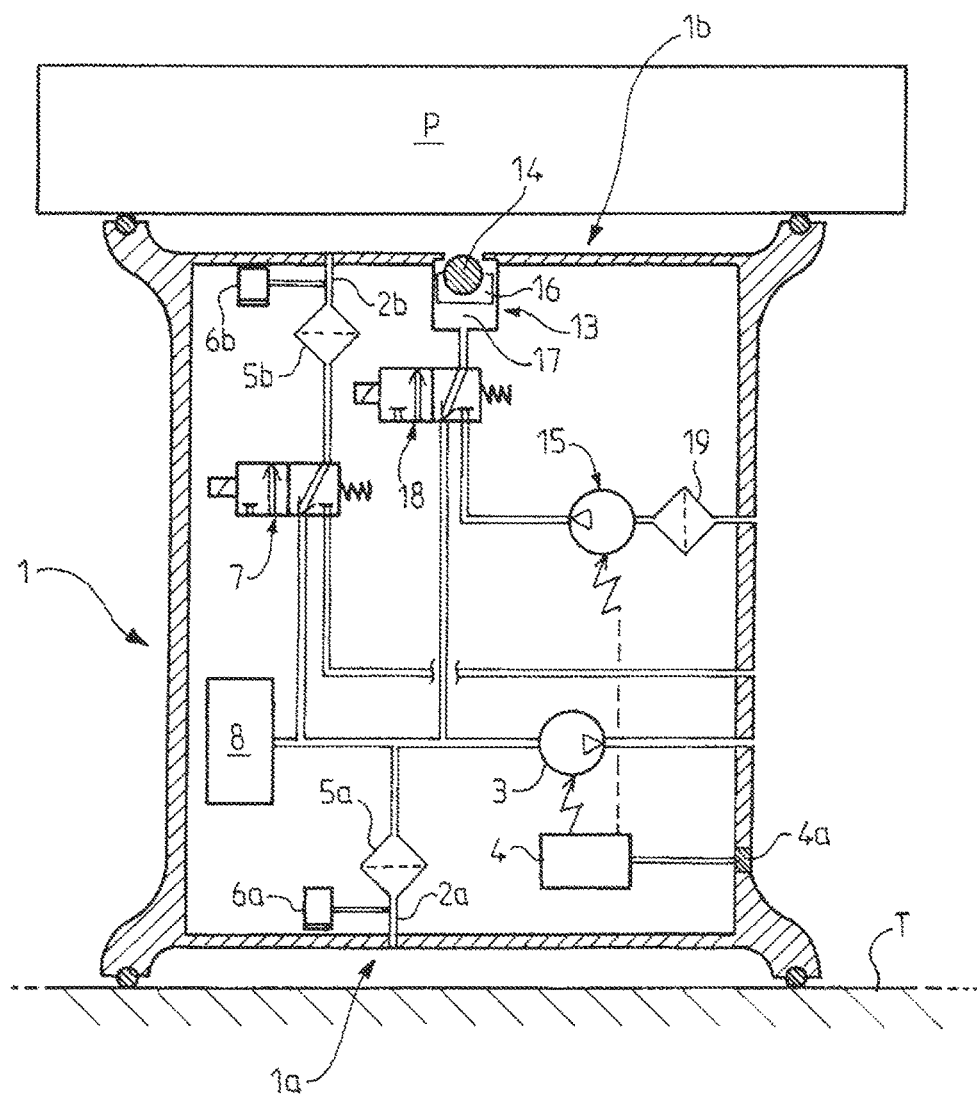
FIG. 3 is a diagram showing a diametral section view of a second implementation of the clamping device of the invention.

In FIG. 3, a second embodiment of the clamping pad of the invention comprises elements that are identical or functionally equivalent to the elements described in reference to FIG. 1.

This second embodiment of the device of the invention further comprises means for lifting the workpiece (P) in order to facilitate moving it in translation and positioning it.

In the example shown, the lifting means for lifting the workpiece (P) comprise a jack (13) having a load-carrier ball (14).

The jack (13) with a load-carrier ball (14) is preferably a pneumatic jack, powered by a pump (15) providing compressed air pressure in order to ensure movement of a piston (16) in a jacket (17).

A control valve (18) is mounted to communicate with the jack (13), in order to enable it to be fed with compressed air and to enable the jack (13) to extend, or to enable communication with the vacuum pump (3) and enable the jack (13) to be withdrawn by suction.

The control valve (18) is preferably a normally open solenoid valve (18), having an inactivated position that is a position of connection with the line for applying suction via the vacuum pump (3).

A filter (19) is preferably provided between the pump (15) and the communication with atmospheric pressure outside the body (1).

The pump (15) is preferably an electric pump powered by the energy source (4) of the vacuum pump (3).

The invention also covers any other method of powering the pump (15), in particular methods of powering remotely, e.g. by electromagnetic, microwave, or any other transmission means.

The electric pump (15), in this example connected to an energy source using electric batteries, is preferably in the form of a unit comprising an electric motor and a suction compression block actuated by said electric motor.

The electric pump (15) is preferably an eccentric diaphragm pump presenting a nominal suction flow-rate lying in the range 1 L/min to 5 L/min and suitable for reaching pressure of the order of 1 bar relative to atmospheric pressure.

The coils or solenoids of the solenoid valves (7) and (18) are also preferably powered by the same energy source (4).

Operation of the second embodiment of the clamping device of the invention is substantially identical to the operation described in reference to FIG. 1, allowing for the addition of additional steps during positioning of the workpiece (P) on the top suction face (1*b*).

After the step of clamping the bottom suction face (1*a*) to the worktable (T) by suction, the pump (15) is activated to move the piston (16) of the jack (13) upwards and to cause the load-carrier ball (14) to exit above the level of the top suction face (1*a*). To do this, the solenoid valve is activated

(18) so as to cause the jacket (17) to communicate with the pump (15) creating pneumatic pressure.

The workpiece (P) is then moved in translation on the load-carrier ball (14) so as to be positioned in the reference position for the work to be carried out. When the workpiece is placed in abutment or in a reference position, the pump (15) creating the pneumatic pressure is stopped and the solenoid valve (18) is deactivated, in such a manner as to be placed in the normally open position shown in FIG. 3, in order to suck the piston (16) and to move it downwards inside the jacket (17), thus retracting the load-carrier ball (14) to below the level of the second face (1b) that is to be secured to the workpiece (P).

The vacuum tank (8) is connected to the jacket (17) in order to ensure the piston (16) is held in the low position with the load-carrier (14) retracted.

Deactivating the solenoid valve (7) thus enables suction to be applied to the top face (1b) that is to be secured to the workpiece (P), thus ensuring clamping of the workpiece (P) prior to performing work thereon.

The rest of the operation steps of the second embodiment of the device of the invention are similar or identical to the steps described in reference to FIG. 1.

In some circumstances, in order to remove or move the worked piece (P), the load-carrier ball (14) may be used above the level of the top suction face (1a). After the step of setting the top suction face (1b) at atmospheric pressure, the pump (15) is activated to move the piston (16) of the jack (13) upwards and to cause the load-carrier ball (14) to exit above the level of the top suction face (1a). To do this, the solenoid valve is activated (18) so as to cause the jacket (17) to communicate with the pump (15) creating pneumatic pressure.

The workpiece (P) is then moved in translation on the load-carrier ball (14) so as to be placed in a position chosen by the operator or by the program of an appropriate machine.

In FIG. 4, another clamping pad of the invention also includes a bottom cover (10) assembled to the body (1) of the clamping pad. The body (1) of the clamping pad of the invention presents a hollow cylindrical shape containing in its top portion a set of several storage batteries (4) that are suitable for being recharged via a socket (4a).

The set of storage batteries (4) is mounted on a plate (11) supporting a vacuum buffer tank (8). The plate (11) is spaced apart from another plate (12) carrying an electronic circuit (not shown in detail) and supporting a solenoid valve (7).

Under its bottom portion, the plate (12) receives a drilled block (12a) to which the vacuum pump is fastened (3), in such a manner that the vacuum pump (3) is suspended inside the body (1) at a predetermined distance making it possible to avoid any water entering while the suction-cup forming bottom face (1a) has suction applied thereto to secure it to the worktable (T).

The assembly suspended in the top portion of the body (1) may thus be installed or removed after removal of the bottom cover (10).

The suction-cup forming bottom face (1a) to be secured by suction to the worktable (T) is attached to the bottom cover (10).

The vacuum pump (3) is, firstly, advantageously associated with a first filter (5a) associated with the suction-cup forming bottom first face (1a).

The vacuum pump (3) is, secondly, advantageously associated with a second filter (5b) associated with the suction-cup forming second face (1b) that is to be secured to a workpiece (P).

A first vacuum gauge (6a) is advantageously provided in order to deliver a signal representative of the suction generated at the suction-cup forming first face (1a), and a second vacuum gauge (6b) is advantageously provided in order to deliver to provide a signal representative of the suction generated at the suction-cup forming second face (1b).

A vacuum gauge (6a) or (6b) is advantageously mounted on a column (6) presenting two open bore holes.

The control valve (7) is connected via ducts (not shown) to the suction-cup forming second face (1b) that is to be secured by suction to the workpiece (P) in order to enable said suction-cup forming second face (1b) to be secured by suction, or in order to enable said suction-cup forming second face (1b) to be set to atmospheric pressure.

The control valve (7) advantageously consists of a solenoid valve that is normally open for applying suction to the second face (1b) to be secured to the workpiece (P), in such a manner as to save the energy of maintaining the solenoid valve (7) in said predetermined suction position.

A vacuum buffer tank (8) connected to the vacuum pump (3) ensures regularity of the vacuum pump (3) and avoids repeated stopping and starting of the vacuum pump at short intervals.

This modular arrangement makes it possible to manufacture clamping-pad forming devices of the invention that are as compact as prior-art double-sided clamping pads as fed by prior-art vacuum hoses.

A fluid curtain is disposed at the periphery of the suction-cup forming top second face (1b), in order to constitute a coaxial capillary gasket and to avoid "drying" and detachment of the suction-cup forming top second face (1b), by further preventing undesirable dust, sludge, swarf, or other particles from penetrating therein.

The fluid curtain, in particular a liquid curtain, thus reinforces sealing by capillarity at the top suction face (1b) and contributes to saving the energy required for establishing suction and for maintaining clamping by suction.

Machining lubrication water is advantageously used to form a fluid curtain or barrier, by pumping using a liquid pump 33 sucking up the machining lubrication water through an outer filter 34 surrounding the body 1 of the clamping pad.

An electronic control circuit connected by communication means, preferably wireless communications means, to the machine-tool makes it possible to manage a stock of double-sided clamping pads of the invention.

The means for lifting the workpiece (P), provided in order to facilitate moving it in translation and positioning it comprise a jack (13) having a load-carrier ball (14).

The jack (13) with a load-carrier ball (14) is preferably a pneumatic jack, powered by a pump (15) providing compressed air pressure in order to ensure movement of a piston (16) in a jacket (17).

A control valve is mounted to communicate with the jack (13), in order to enable it to be fed with compressed air and to enable the jack (13) to extend, or to enable communication with the vacuum pump (3) and enable the jack (13) to be withdrawn by suction.

The control valve (18) is a normally open solenoid valve (18), having an inactivated position that is a position of connection with the line for applying suction via the vacuum pump (3). An air filter is provided between the pump (15) and the communication with atmospheric pressure outside the body (1).

The pump (15) is preferably an electric pump powered by the energy source (4) of the vacuum pump (3).

The jack (13) comprising the jacket (17) is mounted secured to the vacuum tank (8), being disposed centrally relative to the set of storage batteries (4) constituting the electrical energy source of the device.

The base formed by the spaced apart plates 11 and 12 carry the bottom portion of the tank (8) and constitutes a mounting support for the electric vacuum pump (3) and for its associated control valve (7).

The air pump (15) and its associated control valve (18) are also mounted secured to the base formed by the spaced apart plates 11 and 12, in such a manner as to be suspended high up inside the body 1.

The column (6) presents two bore holes in connection with the spaces for applying suction in the bottom and top suction faces (1a, 1b).

An electronic control unit is mounted inside the body (1) and includes a wireless antenna for communicating with a work machine (not shown), preferably by radio communication.

The position of the clamping devices of the invention may thus be controlled remotely by the program contained in the work machine (not shown).

A mounting flange makes it possible to assemble the vacuum tank (8) and the jack (13) components from above. Removing said flange thus makes it possible to completely clean the jack (13) components and the vacuum tank (8).

The arrangement of the second embodiment is similar to the arrangement of the first embodiment described with reference to FIGS. 1 and 2, and makes interchangeability of components possible, in particular of rechargeable storage batteries (4).

The device of the invention is designed to have sufficient energy, in particular electrical energy, to maintain suction while working on workpieces, by ensuring lower clamping to the worktable (T) and upper clamping to the workpiece during the operations carried out by the work machine.

The arrangement of vacuum seals, of a liquid curtain, and of appropriate suction cups makes it possible to save a considerable amount of energy by ensuring that the vacuum pump is stopped, and that pumps operate only to compensate vacuum leaks or during the time intervals corresponding to positioning or to changing step.

The use of a wireless transmission system, in particular by radio frequency, makes it possible to activate the electrical elements, in particular the solenoids of the solenoid valves (7) and (18) only during the operating stages, and thus makes it possible to save energy outside of operating stages, because of the fact that the normally open positions of the valves (7) and (18) correspond to suction positions, without electricity being supplied to their solenoids.

The use of a jack (13) having a load-carrier ball, in particular of a pneumatic jack (13) having a load-carrier ball (14), makes it possible to extend the load-carrier ball (14) quickly and to place the workpiece (P) that is to be machined in a reference position for the work, in simple and reliable manner.

The retraction of the piston (16) by putting it into communication with the suction source ensures that the load-carrier ball (14) is retracted below the plane of the workpiece (P) to which suction is applied and thus avoids the bottom surface of the workpiece being marked while the workpiece is being machined by a work machine (not shown).

Provision of a vacuum tank (8) facilitates clamping the workpiece in simple and fast manner, avoiding energy consumption caused by successive stopping and starting of the vacuum pump (3), and thus saving on energy supply.

Recharging storage batteries (4) between loading two workpieces (P) enables a set of double-sided clamping pads to be made available constantly and continuously.

The use of filters (5a, 5b, and 19) protects the vacuum and air ducts against external pollution caused by working on or machining of the workpiece (P).

A fluid curtain is disposed at the periphery of the top suction face (1b) in such a manner as to prevent undesirable dust, sludge, swarf, or other particles from penetrating therein.

The fluid curtain, in particular the liquid curtain, makes it possible to reinforce sealing by capillarity at the top suction face (1b).

Machining lubrification water may advantageously be used to form a barrier or fluid curtain, possibly by pumping using an additional liquid pump.

The electronic control circuit connected by communication means, preferably wireless communications means, to the machine-tool makes it possible to manage a stock of double-sided clamping pads of the invention.

The machine tool for machining (not shown) may advantageously include a programmable machine or a dedicated industrial micro-computer that governs both the positioning and the moving of the double-sided clamping pads of the invention.

In an economical version of the invention, the double-sided clamping pads may include switches or on/off control members outside the body (1) to enable the devices of the invention and their electrical members, such as electric pumps or solenoid valves to be operated to execute the operating steps in sequential, staggered, or simultaneous manner.

Operation of the top suction face may be improved by providing a flange or skirt coaxial with the corresponding suction cup of the top suction face.

Said additional coaxial flange or skirt makes it possible to limit the length of time of the vacuum pumps are in operation and makes it possible to reduce their normal flow-rate as well as the energy required for operating of the device of the invention.

By means of the invention, the suction hoses of the prior art are completely eliminated, and the double-sided clamping pads of the invention may be installed in any position on the worktable (T) in order to support a workpiece (P) in optimum manner.

The invention described in reference to two particular embodiments is not limited thereto, but on the contrary covers any modification in form and any variant embodiment within the ambit of the accompanying claims.

The invention claimed is:

1. A device forming a clamping pad comprising;
a body presenting a first face to be secured by suction to a worktable; and
a second face to be secured by suction to a workpiece, wherein the body contains means for generating suction, which suction generator means are linked, through at least a duct, to said first face to be secured to the worktable and to said second face to be secured to a workpiece and are able to generate suction on the first and second faces, wherein the suction generator means comprise a vacuum pump and an energy source for powering said vacuum pump, the vacuum pump and the energy source being located within the body, wherein the body contains a vacuum buffer tank, connected to said suction generator means and suitable, when evacuated by the suction generator means through said duct, for applying suction to said first and second faces,
wherein the device comprises means for lifting the workpiece, in order to facilitate moving the workpiece in translation and positioning the workpiece.

2. A device according to claim 1, wherein the energy source for powering said vacuum pump comprises at least one battery.

3. A device according to claim 2, wherein the suction generator means present means forming an on/off switch for the power supply.

4. A device according to claim 2, wherein the suction generating means present at least one normally open valve for applying suction to the second face to be secured to the workpiece, in such a manner as to save the energy of maintaining the valve in a predetermined position.

5. A device according to claim 2, wherein the body contains a vacuum buffer tank, suitable for applying suction by means of the suction generator means.

6. A device according to claim 2, wherein said means for lifting the workpiece is controlled by at least one normally open valve for applying suction, in such a manner as to save the energy of maintaining the valve in a predetermined position.

7. A device according to claim 1, wherein the suction generator means present means forming an on/off switch for the power supply.

8. A device according to claim 1, wherein the suction generator means present at least one normally open valve for applying suction to the second face to be secured to the workpiece, in such a manner as to save the energy of maintaining the valve in a predetermined position.

9. A device according to claim 8, wherein the normally open valve for applying suction to said second face to be secured by suction to the workpiece, is connected in parallel on the line for applying suction to the first face to be secured to the worktable.

10. A device according to claim 1, said means for lifting the workpiece comprise a jack.

11. A device according to claim 1, wherein said means for lifting the workpiece is controlled by at least one normally open valve for applying suction, in such a manner as to save the energy of maintaining the valve in a predetermined position.

12. A device according to claim 1, wherein the energy source for powering said vacuum pump comprises at least one rechargeable battery.

13. A device according to claim 1, wherein said means for lifting the workpiece comprise a jack having a load-carrier ball.

14. A device forming a clamping pad, comprising a body presenting a first face to be secured by suction to a worktable and a second face to be secured by suction to a workpiece, wherein the body contains means for generating suction, which suction generator means are linked to said first face to be secured to the worktable and to said second face to be secured to a workpiece, means for lifting the workpiece, in order to facilitate moving the workpiece in translation and positioning the workpiece, wherein said means for lifting the workpiece comprise a jack having a load-carrier ball.

15. A device forming a clamping pad, comprising a body presenting a first face to be secured by suction to a worktable and a second face to be secured by suction to a workpiece, wherein the body contains means for generating suction, which suction generator means are linked to said first face to be secured to the worktable and to said second face to be secured to a workpiece, means for lifting the workpiece, in order to facilitate moving the workpiece in translation and positioning the workpiece, and said means for lifting the workpiece is controlled by at least one normally open valve for applying suction, in such a manner as to save the energy of maintaining the valve in a predetermined position.

\* \* \* \* \*